US007610403B2

(12) United States Patent
Jinzaki

(10) Patent No.: US 7,610,403 B2
(45) Date of Patent: Oct. 27, 2009

(54) DEVICE RETRIEVING A NAME OF A COMMUNICATIONS NODE IN A COMMUNICATIONS NETWORK

(75) Inventor: Akira Jinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 466 days.

(21) Appl. No.: 10/123,243

(22) Filed: Apr. 17, 2002

(65) Prior Publication Data

US 2002/0124060 A1 Sep. 5, 2002

Related U.S. Application Data

(63) Continuation of application No. PCT/JP99/06052, filed on Oct. 29, 1999.

(51) Int. Cl.
*G06F 15/173* (2006.01)
(52) U.S. Cl. .................. 709/240; 709/227; 709/238; 709/245
(58) Field of Classification Search .......... 709/210, 709/227–229, 245, 208–209, 223, 238, 240
See application file for complete search history.

(56) References Cited

U.S. PATENT DOCUMENTS

| 5,025,491 | A | * | 6/1991 | Tsuchiya et al. | 340/825.52 |
| 5,617,540 | A | * | 4/1997 | Civanlar et al. | 370/395.54 |
| 5,664,185 | A | * | 9/1997 | Landfield et al. | 707/104.1 |
| 5,878,212 | A | * | 3/1999 | Civanlar et al. | 709/203 |
| 6,112,248 | A | * | 8/2000 | Maciel et al. | 709/238 |
| 6,154,777 | A | * | 11/2000 | Ebrahim | 709/227 |
| 6,167,446 | A | * | 12/2000 | Lister et al. | 709/223 |
| 6,862,629 | B1 | * | 3/2005 | Hericourt | 709/238 |
| 2001/0023459 | A1 | * | 9/2001 | Asami | 709/245 |
| 2003/0169766 | A1 | * | 9/2003 | Ogawa | 370/466 |

FOREIGN PATENT DOCUMENTS

| EP | 081744 A2 | 1/1998 |
| JP | 07182264 | 7/1995 |
| JP | 11055319 A | 2/1999 |
| WO | WO 97/48050 | * 12/1997 |

OTHER PUBLICATIONS

A. Jinzaki et al., Ipv4-Ipv6 Interconnection Gateway using SOCKS Protocol SOCKS64, Dec. 1997, pp. 1-10, with partial translation.

* cited by examiner

*Primary Examiner*—Ario Etienne
*Assistant Examiner*—Lashanya R Nash
(74) *Attorney, Agent, or Firm*—Staas & Halsey LLP

(57) ABSTRACT

In a network 101, a relay 104 makes a name search of a communication destination node 102d based on a request from a communication source node 102s according to a condition into which at least one or a plurality of information effective for identifying the communication destination node 102d, such as the running state, the use state, the positional information, and the information representing the characteristic of the communication destination node 102d, information representing the information held by the communication destination node 102d, and the like are combined. The relay 104 makes a reply by searching a database of a DNS, etc. for information identifying the communication destination node 102d, or obtains and replies the information by actually inquiring the communication destination node 102d at the time of an inquiry.

19 Claims, 9 Drawing Sheets

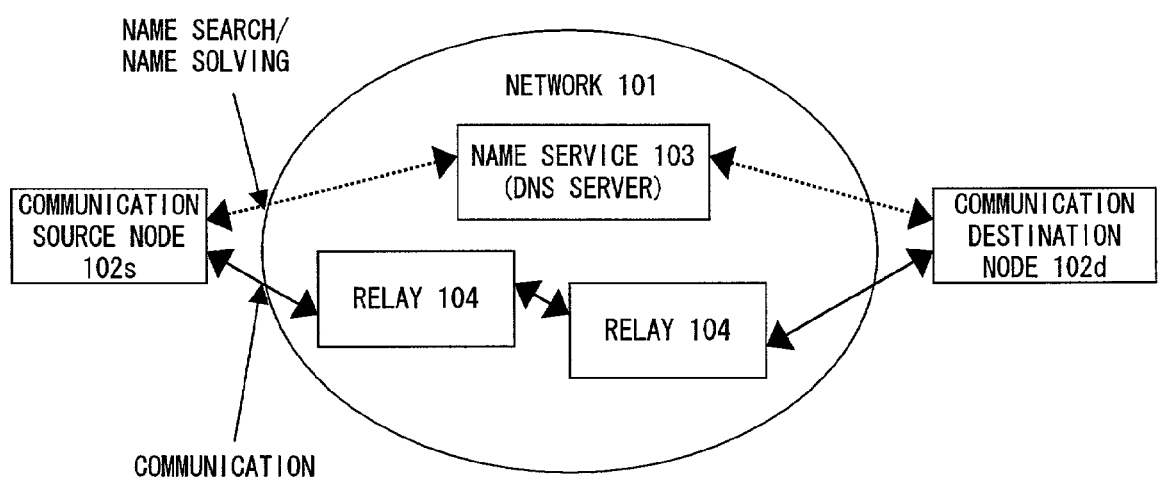
F I G. 1

```
ISI.EDU.         MX    10 VENERA.ISI.EDU.
                 MX    10 VAXA.ISI.EDU.
VENERA.ISI.EDU.  A     128.9.0.32
                 A     10.1.0.52
VAXA.ISI.EDU.    A     10.2.0.27
                 A     128.9.0.33
```

FIG. 2

```
ISI.EDU.         XXX    PARAMTER LIST
```

FIG. 3

```
                    DNS INQUIRY
           +----------------------------------------+
Header     | OPCODE=SQUERY                          |
           +----------------------------------------+
Question   | QNAME=SRI-NIC.ARPA., QCLASS=IN, QTYPE=A|
           +----------------------------------------+
Answer     | <empty>                                |
           +----------------------------------------+
Authority  | <empty>                                |
           +----------------------------------------+
Additional | <empty>                                |
           +----------------------------------------+
```

FIG. 4A

```
                     DNS REPLY
           +----------------------------------------+
Header     | OPCODE=SQUERY, RESPONSE, AA            |
           +----------------------------------------+
Question   | QNAME=SRI-NIC.ARPA., QCLASS=IN, QTYPE=A|
           +----------------------------------------+
Answer     | SRI-NIC.ARPA. 86400 IN A 26.0.0.73     |
           |               86400 IN A 10.0.0.51     |
           +----------------------------------------+
Authority  | <empty>                                |
           +----------------------------------------+
Additional | <empty>                                |
           +----------------------------------------+
```

FIG. 4B

```
              REPLY TO INQUIRY USING WILDCARD
           +----------------------------------------+
Header     | OPCODE=SQUERY, RESPONSE, AA            |
           +----------------------------------------+
Question   | QNAME=SRI-NIC.ARPA., QCLASS=IN, QTYPE=*|
           +----------------------------------------+
Answer     | SRI-NIC.ARPA. 86400 IN  A    26.0.0.73 |
           |                         A    10.0.0.51 |
           |                         MX   0 SRI-NIC.ARPA.|
           |                         HINFO DEC-2060 TOPS20|
           +----------------------------------------+
Authority  | <empty>                                |
           +----------------------------------------+
Additional | <empty>                                |
           +----------------------------------------+
```

FIG. 5

```
poweron.ISI.EDU.  A      128.9.0.32
                  A      10.1.0.52
```

FIG. 6

| | |
|---|---|
| REPLY TO INQUIRY, BASED ON DOMAIN NAME, OF HOST THAT IS POWERED ON || 
| Header | OPCODE=SQUERY, RESPONSE, AA |
| Question | QNAME= poweron.ISI.EDU., QCLASS=IN, QTYPE=A |
| Answer | poweron.ISI.EDU. 86 IN  A      128.9.0.32<br>                         A      10.1.0.52 |
| Authority | <empty> |
| Additional | <empty> |

FIG. 7

```
ISI.EDU.        PON     H1.ISI.EDU. H2.ISI.EDU.
H1.ISI.EDU.     A       128.9.0.32
H2.ISI.EDU.     A       10.1.0.52
```

FIG. 8

```
+------------------------------------------------------------+
|   REPLY TO INQUIRY, BASED ON PON RECORD TYPE,              |
|   OF HOST THAT IS POWERED ON                               |
+------------+-----------------------------------------------+
| Header     | OPCODE=SQUERY, RESPONSE, AA                   |
+------------+-----------------------------------------------+
| Question   | QNAME= ISI.EDU., QCLASS=IN, QTYPE=PON         |
+------------+-----------------------------------------------+
| Answer     | ISI.EDU.     86 IN  PON   H1.ISI.EDU. H2.ISI.EDU.|
+------------+-----------------------------------------------+
| Authority  | <empty>                                       |
+------------+-----------------------------------------------+
| Additional | <empty>                                       |
+------------+-----------------------------------------------+
```

FIG. 9

```
poweron.ISI.EDU.   EXEC PON  `search-poweron-hosts`
```

FIG. 10

```
coma   up 48 days,  3:30,   load average: 0.00, 0.00, 0.00
xxx    up 15 days, 22:40,   load average: 0.00, 0.00, 0.00
```

FIG. 11

```
+-----------------------------------------------------------+
|  REPLY TO INQUIRY, BASED ON DOMAIN NAME,                  |
|  OF HOST THAT IS POWERED ON                               |
+----------+------------------------------------------------+
| Header   | OPCODE=SQUERY, RESPONSE, AA                    |
+----------+------------------------------------------------+
| Question | QNAME= poweron.ISI.EDU., QCLASS=IN, QTYPE=PON  |
+----------+------------------------------------------------+
| Answer   | poweron.ISI.EDU. 86 IN  PON   coma.ISI.EDU     |
|          |                         PON   xxx.ISI.EDU      |
+----------+------------------------------------------------+
| Authority| <empty>                                        |
+----------+------------------------------------------------+
|Additional| <empty>                                        |
+----------+------------------------------------------------+
```

FIG. 12

```
| poweron.ISI.EDU.  0 EXEC PON  `search-poweron-hosts` |
```

FIG. 13

```
| poweron.ISI.EDU.  0 EXEC.LOCAL PON  `search-poweron-hosts` |
```

FIG. 14

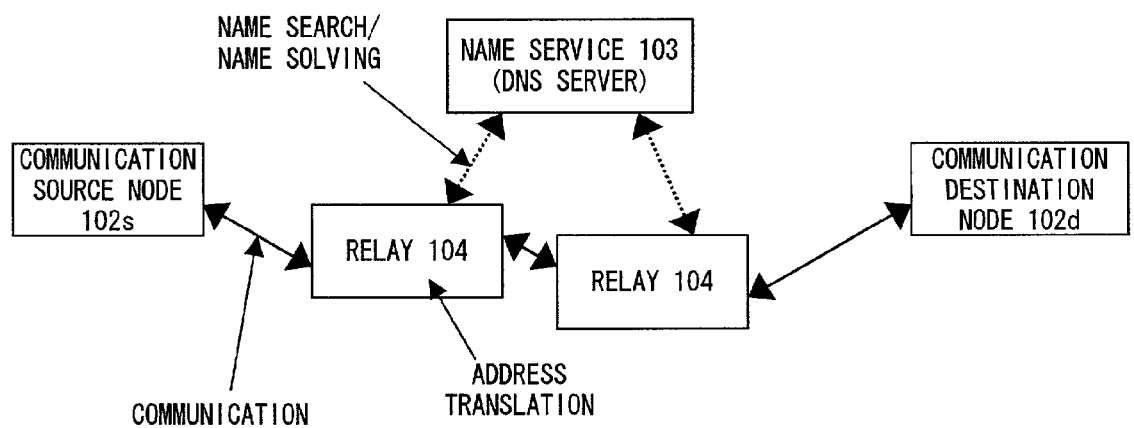
F I G. 1 5

DEVICE RETRIEVING A NAME OF A COMMUNICATIONS NODE IN A COMMUNICATIONS NETWORK

CROSS REFERENCE TO RELATED APPLICATION

The application is a continuation of international PCT application No. PCT/JP99/06052 filed on Oct. 29, 1999.

BACKGROUND OF THE INVENTION

1. Field of the Invention

The present invention relates to a communications node name retrieving technique for identifying respective communications nodes at communication source and destination, and for specifying the respective communications nodes with network addresses in a computer network system such as the Internet, etc.

2. Description of the Related Art

In a communication, a network address such as an IP address is information essential for specifying a communications node. The network address is an address that represents a network position assigned to a communications node. A network system delivers communication information to a destination by using a network address as a clue.

Here, a communications node or a node means a network device connected to a network, such as a device (host) which becomes an end point of a communication, a router relaying a communication between hosts, or the like.

As described above, a user who makes a communication must determine a node at a communication destination, and its network address prior to making the communication. A domain name server (see DNS, RFC1591, RFC1034, and RFC1035), which is a name service function used on the Internet, is one method implementing the above described function. With the DNS, a communication partner is specified according to an FQDN or a predefined record type, so that the network address of the communication partner can be obtained, or an FQDN can be obtained from a network address inversely. The FQDN is called a fully qualified domain name, and indicates a name that completely describes from a host name to a highest-order domain name in a format like "xxx.yyy.fujitsu.co.jp". The DNS is a distributed database system. With this database system, information registered at a certain point is gradually reflected on the whole of the database. Therefore, in a DNS system, a delay exists when an information change is reflected on the whole of the system.

SUMMARY OF THE INVENTION

There is a limit of a conventional name service retrieving function such as the DNS, etc. For example, it is conventionally impossible to search for a computer currently used by a certain human being, a computer in a particular location, or a computer holding certain information. Implementing the function for searching for a network address according to such diverse conditions is a first object of the present invention.

Next, with conventional techniques, obtaining (solving) a network address by using a name service is fundamentally the role of a node that is to make a communication. However, for instance, if a network address of "one of computers that are powered on in a particular room" is desired to be learned, it is impractical to search for such information by using a single database such as a DNS. Even if such information can be registered to the DNS, an actual state cannot be accurately reflected if power is frequently turned on/off. This is because a delay exists until the information becomes available in the whole of the network system. Additionally, it is impractical to put the states of all of computers connected to a network into a database for the whole of the network, since the database must be frequently updated. Accordingly, a second object of the present invention is to implement a function for locally storing information about a communications node, and for enabling an inquiry only if it is necessary.

Lastly, since a final network address is obtained in a communications node that becomes an end point of a communication with the conventional techniques, the state of a communication destination node must be grasped from a remote site prior to the communication. For example, if a communication is made with "one of computers that are powered on in a particular room", such a communication destination node is first determined, and its network address is obtained, so that the communication is started. However, the corresponding node can possibly be powered off when the communication is actually made. In such a case, the communication fails, and a user must again perform the operations from the determination of a communication destination node. A third object of the present invention is to implement a function for determining a communication destination node, and for obtaining a network address while a network system relays a communication.

The present invention assumes a name retrieving device retrieving information for identifying a communications node that is a network device within a communications network.

One preferred embodiment of the present invention comprises a condition searching unit searching for information identifying a communications node according to a name search condition into which at least one or a plurality of information effective for identifying the communications node, such as the running state, the use state, the positional information, and information representing the characteristic of the communications node, information representing the information held by the communications node, and the like are combined.

As a result, communications node retrieval and network address obtainment can be implemented according to diverse conditions that are not conventionally used.

Another preferred embodiment of the present invention comprises an address translating/relaying unit, which is included in a network device within a communications network, translating a network address into a final network address for identifying a communications node at a communication destination, when a communication is relayed from a communications node at a communication source, for which a condition for designating the communication node at the communication destination as the network address corresponding to the communications node at the communication destination is specified.

As a result, a node that is as suitable as the communications node at the communication destination as possible can be determined.

BRIEF DESCRIPTION OF THE DRAWINGS

FIG. 1 shows the fundamental system configuration of respective preferred embodiments of the present invention;

FIG. 2 explains a representation format defining an RR for a domain name in a DNS in a first preferred embodiment of the present invention;

FIG. 3 explains an RR that is newly defined in the DNS in the first preferred embodiment of the present invention;

FIG. 4A exemplifies the data formats of an inquiry of the DNS in the first preferred embodiment of the present invention;

FIG. 4B exemplifies the data formats of a reply of the DNS in the first preferred embodiment of the present invention;

FIG. 5 exemplifies a reply to a DNS message using a wildcard in the first preferred embodiment of the present invention;

FIG. 6 exemplifies the settings of a DNS database to which a method incorporating the state, etc. of a node 102 into a domain name is applied in the first preferred embodiment of the present invention;

FIG. 7 exemplifies the data format of a reply message when a host that is powered on is inquired in the DNS database to which the method incorporating the state, etc. of a node 102 into a domain name is applied in the first preferred embodiment of the present invention;

FIG. 8 exemplifies an implementation of a method defining the state, etc. of a node 102 with a resource record in the first preferred embodiment of the present invention;

FIG. 9 exemplifies the data format of a reply message when a host that is powered on is inquired in a DNS database to which the method defining the state, etc. of a node 102 with a resource record is applied in the first preferred embodiment of the present invention;

FIG. 10 exemplifies a definition of a resource record in a DNS database to which a method detecting the state of a node 102 at the time of an inquiry is applied in the first preferred embodiment of the present invention;

FIG. 11 exemplifies an execution result of a rup command;

FIG. 12 exemplifies the data format of a reply message when a host that is powered on is inquired in the DNS database to which the method detecting the state of a node 102 at the time of an inquiry is applied in the first preferred embodiment of the present invention;

FIG. 13 explains a TTL;

FIG. 14 exemplifies a definition of a DNS record whose unpropagation attribute is explicitly described in a second preferred embodiment of the present invention;

FIG. 15 explains the principle of a third preferred embodiment of the present invention.

DESCRIPTION OF THE PREFERRED EMBODIMENTS

Figure 16:
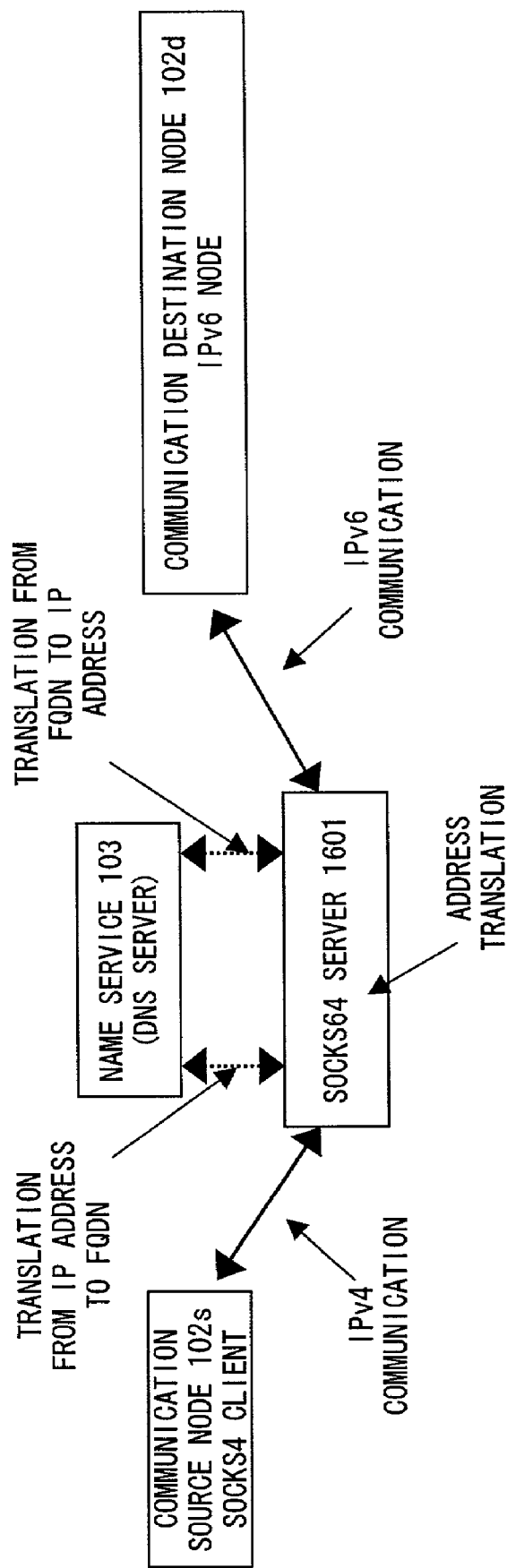
FIG. 16 exemplifies the system configuration where the third preferred embodiment of the present invention is implemented by using a relay 104 which can process a SOCKS64 protocol.

Hereinafter, preferred embodiments according to the present invention will be described in detail with reference to the drawings.

Fundamental System Configuration

FIG. 1 shows the fundamental system configuration of respective preferred embodiments according to the present invention.

A network 101 comprises a communication source node 102s, a communication destination node 102d, a name service (DNS server) 103, relays 104, etc.

The communication source node 102s determines (solves) a network address of a communication destination node 102d by inquiring the name service 103 within the network 101 about the name of the communication destination node 102d prior to a communication with the communication destination node 102d. Thereafter, the communication source node 102s makes the communication with the communication destination node 102d via the relays 104 within the network 101 by using the network address.

First Preferred Embodiment of the Present Invention

The first preferred embodiment of the present invention, which is based on the system configuration shown in FIG. 1, implements node search and network address obtainment according to diverse conditions, which are not conventionally used, by providing a name search function which can search for a node by specifying type information that is not handled by a conventional name search service such as a DNS, etc.

Namely, the first preferred embodiment of the present invention comprises a "condition retrieval capability" for retrieving the name of a node 102 (indicating communication source and destination nodes 102s and 102d. The same goes for the subsequent description) within the network 101 according to a "condition" into which at least one or a plurality of information effective for identifying the node 102, such as the running state, the use state, the positional information, and information representing the characteristic of the node 102, information representing the information held by the node 102, and the like are combined.

As the running state of the node 102, at least one or a plurality of the state of a power supply, and the connection and the communication states of a network can be specified.

Additionally, as the use state of the node 102, at least one or a plurality of information about a user, information about a running time, and information about a load can be specified.

Furthermore, as the positional information of the node 102, at least one or a plurality of a geographical position or coordinate information, an address or a postal code used by a postal service, and a number of a building or a room can be specified.

Still further, as the information representing the characteristic of the node 102, at least one or a plurality of the type, the function, the shape, and the color, the device information, the software information, the performance, the administrator information of the node 102, etc. can be specified.

Still further, as the information representing the information held by the node 102, at least one or a plurality of management information such as the name, etc. of a file existing in a local file system of the node 102, and an information type stored in the file, etc. can be specified.

As the method specifying a node 102 according to the above described diverse conditions, there are a method putting the information about the node 102 into a database in some form in a relay 104, and a method actually inquiring the node 102 about the information at a certain time point. Whether certain information is suitable either for being put into a database or for an inquiry type depends on the nature of the information. Since information such as the name of a node 102, and a service function (NS, MX, etc.), which are already implemented by a DNS, are not updated in units of seconds, they are suitable for being put into a database. Also most of information such as the type, the hardware configuration, the software configuration, etc. of the node 102 are suitable for being put into a database. In the meantime, information such as whether or not a node 102 is running, which user uses the node 102, how heavy a load is, etc. are information which continuously vary. Therefore, they are more suitable for an "inquiry type" that examines the information on need.

The framework of a DNS is flexible, and it is easy to increase a record type that is registered to its database. Accordingly, information of a type suitable for being put into a database can be retrieved with the database retrieval function that the DNS possesses by defining a new record type. Note that, however, standardization procedures are necessary for general use of such a record type.

In the meantime, to make an inquiry on demand, an inquiry server is necessary. The inquiry server makes an inquiry to a node group that the server itself manages, and returns an inquiry result to an inquiry source. One method implementing this is to arrange a new type in a DNS inquiry. When an inquiry of this type is made, the DNS does not retrieve a database, and actually performs an inquiry process for a target node 102. Another method is to arrange a dedicated server without using the DNS.

As contents that can be inquired, there are a result of execution of a command such as rup, rwho, rusers, etc., with which the running state or the use state of a node 102 connected to a local network is obtained, and a result of execution of a command such as ping, traceroute, etc., with which a communication state is obtained.

Next, a specific example of including a DNS system in the first preferred embodiment of the present invention is explained.

The DNS is a name retrieving system of a database type, and is a considerably complex system that includes the structure of a database, the representation form of data, the formats of an inquiry and a reply, procedures, etc. Here, a necessary mechanism as minimum as possible is explained. As for a mechanism that propagates database information, a second preferred embodiment of the present invention, which will be described later, proposes a mechanism that performs control in order not to use this propagation mechanism. Since this mechanism is irrelevant to the present invention as a whole, its explanation is omitted entirely. All of explanations cite an RFC (Request For Comment), which is an Internet standard document.

In this preferred embodiment, a DNS system is included in one or a plurality of relays 104 within the network 101 shown in FIG. 1.

The representation form of a DNS database is first explained. The DNS adopts the idea that the name for identifying a host is a domain name, and the domain name has a resource record (RR). A representation format defining an RR for a certain domain name is shown in FIG. 2.

The leftmost field (ISI.EDU.) is called an owner, which represents a domain name holding this RR. The second field (MX) is called a type, which represents the type of this RR. The third field (10 VENERA.ISI.EDU.) is called RDATA, which is a parameter defined depending on the type. As RRs of the DNS, also a class, a TTL, etc. exist. However, these RRs are omitted for simplification in this preferred embodiment.

The example shown in FIG. 2 describes that the MXs (indicating hosts having a mechanism called Mail Exchange) of the domain named ISI.EDU are VENERA. ISI.EDU and VAXA.ISI.EDU., the Internet addresses of VENERA.ISI.EDU are 128.9.0.32 and 10.1.0.52, and the Internet addresses of VAXA.ISI.EDU. are 10.2.0.27 and 128.9.0.33.

As the type, various types are defined, and a new type can be defined also hereafter. In a database, the meaning and the parameters of a type named, for example, XXX are defined, so that a new RR may be registered to the database, for instance, in the format shown in FIG. 3.

FIG. 4 shows the data formats of DNS inquiry and reply. In the DNS, an inquiry and its reply have the same data format.

Header is a message header, and stores OPCODE. SQUERY indicates that this message is an inquiry. RESPONSE indicates that this message is a reply. AA (Authoritative Answer) is irrelevant to the present invention.

Question indicates the contents of an inquiry. QNAME is a domain name to be inquired. QCLASS is a class to be inquired. QTYPE is a resource record to be inquired. In the example shown in FIG. 4A, an inquiry is made about A (address) of an IN (Internet) class of an SRI-NIC.ARPA. domain.

Answer is set in the reply message shown in FIG. 4B. This examples shows that there are two addresses of the IN class of the SRI-NIC.ARPA.

A wildcard can be used for an inquiry. For example, if QTYPE=* (wildcard) is specified as shown in FIG. 5, all of resource records on the SRI-NIC.ARPA. domain are replied. In this figure, HINFO means Host INFormation, and indicates the information about a computer.

As a method representing the state, etc. of a node 102 in a DNS system, three types of methods are considered.

1. A method incorporating the state, etc. of a node 102 into a domain name

2. A method defining the state, etc. of a node 102 with a resource record

3. A method detecting the state of a node 102 at the time of an inquiry

1. The Method Incorporating the State, etc. of a Node 102 Into a Domain Name With this method, a definition representing a host that is powered on in an SRC-NIC.ARPA. domain is introduced according to, for example, a domain name poweronhost.SRC-NIC.ARPA. Although poweronhost is a mere character string, it is defined as a reserved word, and its meaning is strictly defined, so that this character string can be used for the objects of the present invention. The above described definition method can be applied to the running state of a node 102, the use state of the node 102, the positional information of the node 102, information representing the characteristic of the node 102, information held by the node 102, etc., which are claimed by the present invention.

FIG. 6 exemplifies the settings of a DNS database to which the method incorporating the state, etc. of a node 102 into a domain name is applied.

With this method, for example, as shown in FIG. 7, there is no need to change conventional DNS functions for DNS retrieval, inquiry, and reply. A point changed from the conventional DNS is that the contents of a database are modified each time a change occurs in the state of a node 102.

By way of example, if a node 102 having a network address 10.1.0.52 is powered off, the network address 10.1.0.52 is deleted from the A record of poweron.ISI.EDU.

The above described database update can be implemented by periodically examining the state of a node 102 corresponding to each record within a DNS database, by reflecting an examination result on the DNS database, and by making a name server program reload the database. The frequency of the update depends on the target state of a node 102. However, as for a power supply state of the node 102, it is sufficient to make an update every several minutes. With this method, the load of the update process becomes problematic if a frequent update is required. However, if an update is not frequent, this method is practical.

As another method updating a database, there is a method with which a node 102 itself notifies a device which manages a DNS database of a change in the state of the node 102, and the device updates the DNS database based on the notification. Compared with the method periodically detecting a change, an immediate update can be made. Because it is evident that such a method can be implemented with a known technique, an implementation example of such a method is omitted.

2. The Method Defining the State, etc. of a Node 102 With a Resource Record A resource record that represents the state, etc. of a node 102 does not conventionally exist. Accordingly, a resource record must be newly defined to implement this method. In this case, if this method is broadly classified, it can be classified into a method representing the state itself of a node 102 with a resource record, and a method using a particular server which examines the state, etc. of a node 102, and replies its information. The second method explained here is the former method. The latter method will be described later as the third method.

FIG. 8 exemplifies an implementation of the method defining the state, etc. of a node 102 with a resource record. As explained earlier, a resource record can be defined with a class and a type. In this figure, PON is newly defined as a record type. In this example, it is defined as the PON that hosts powered on in an ISI.EDU domain are H1.ISI.EDU, and H2.ISI.EDU, and the addresses of the hosts are respectively described in the record.

An inquiry in this method is made, for example, by using a message where QTYPE=PON is set. A reply to this inquiry is, for example, as shown in FIG. 9, the domain name of the hosts defined in the corresponding PON record within the DNS database. When network addresses are obtained, an inquiry is again made to the DNS based on the domain name of the hosts obtained as described above.

The above described method is inherently the same as the method incorporating the state, etc. of a node 102 into a domain name in a sense that the DNS database is modified according to a change in the state of the node 102, and retrieval is made for the modified database.

3. The Method Detecting the State of a Node 102 at the Time of an Inquiry

The above described first and second methods are methods that reflect a change in the state of a node 102 on a DNS database, and can be naturally implemented by using the current framework of a DNS. However, these methods have problems such that the load of the process for updating a DNS database is increased, a longer time is required until a change in the state of a node 102 is reflected on a DNS database, and the like.

Accordingly, with the third method explained here, a framework for detecting a change in the state of a node 102 when an inquiry occurs, and for returning a suitable reply is newly arranged. As one example of such a framework, there is a method with which a DNS server executes a predetermined state examining command for a node 102 based on an inquiry.

FIG. 10 exemplifies a definition of a resource record in a DNS database to which the method detecting the state of a node 102 at the time of an inquiry is applied. In this figure, a class EXEC is a newly defined class, with which a DNS server executes a predetermined command and returns its reply. In this case, the DNS server executes the command (search-poweron-hosts) specified in the RDATA field of the record type PON, and returns its result. The search-poweron-hosts command is a command which searches for a host that is powered on and exists within a predetermined range, and returns the name of the searched host. For example, in a UNIX system, a rup command is executed, whereby a list of running hosts can be easily obtained as shown in FIG. 11. With the rup command, also the load state of a host can be obtained, thereby easily searching also for a host the load of which is light.

FIG. 12 exemplifies the data format of a reply message to an inquiry implemented with this method.

In addition to the above described first preferred embodiment of the present invention, a variety of implementation methods such as generating a dedicated server which examines the state of a node 102, and the like are considered. However, the above provided example sufficiently demonstrates that the present invention can be implemented.

Second Preferred Embodiment of the Present Invention

According to the second preferred embodiment of the present invention, which is based on the system configuration shown in FIG. 1, an attribute by which a particular entry within a name database is not transferred to a different name database can be specified in order to localize part of the information within the name database in the network 101.

An inquiry or an update for the information for which this non-transfer attribute is specified is processed similar to normal information. However, the state of an update of this information is not propagated to a different name database.

Information of the "inquiry type", which is explained in the first preferred embodiment of the present invention, is attached with a non-transfer attribute explained below, and registered to a name database, so that the inquiry process can be reduced.

Next, a specific example of applying the second preferred embodiment of the present invention to a DNS system is explained.

Also in this preferred embodiment, the DNS system is included in one or a plurality of relays 104 within the network 101 shown in FIG. 1.

In the DNS system, name information is managed in management units called zones. At this time, it is inefficient to always transfer an inquiry to a server that manages zones. Therefore, the DNS server has a function for caching a result of an inquiry recently made, and for reusing the result. Additionally, the DNS server has a function (Zone Transfer function) for collectively transferring information within a particular zone. However, caching information that frequently varies, such as the state of a node 102, etc. by a different server is dangerous, since earlier information can possibly be reused.

Accordingly, information that should not be cached or propagated to a different DNS server as zone information must be explicitly described in a DNS database. A conventional DNS system has a capability for restricting the time of caching in seconds by defining a TTL (Time To Live) value, for example, as shown in FIG. 13. In this figure, a value 0 that precedes EXEC is the TTL. As described above, if the TTL value is set to 0, the caching is not performed. Note that a minimum TTL can be specified in another format in a SOA (Start Of Authority) record.

However, the TTL is strictly intended to stipulate the valid time of a record in a DNS server on a side that inquiries the record, and not to perform caching or include information in a zone transfer. Therefore, in the second preferred embodiment of the present invention, for example, as shown in FIG. 14, information is added to a class, so that an unpropagation attribute is explicitly described. In this figure, EXEC in the class field is the class stated earlier, and .LOCAL is a class modifier. Neither the caching nor the zone transfer is made for a record to which .LOCAL is added.

Third Preferred Embodiment of the Present Invention

The third preferred embodiment of the present invention, which is based on the system configuration shown in FIG. 1, implements the determination of a node that is as suitable as a communication destination node 102*d* as possible by delaying the determination of the communication destination node 102*d* as much as possible in a communication within the network 101.

In the third preferred embodiment of the present invention, when a communication is made, a communication source node 102 itself does not determine a final communication destination node 102*d*, but starts the communication by using a "condition for specifying a communication destination node 102*d*" as a network address. When communication information is relayed within the network 101, a relay 104 translates the above described network address into the final network address of the communication destination node 102*d*. As a result, the determination of the communication destination node 102*d* is made in a position that is closer to the communication destination node 102*d* than the position of the communication source node 102*s*, which is the remotest in terms of the network, whereby a more suitable node is expected to be selected.

In the third preferred embodiment of the present invention, a "condition for specifying a communication destination node 102*d*" can be specified as a network address. An "address translation mechanism" is arranged in a relay 104 as shown in FIG. 15, thereby enabling the translation of a network address into a more suitable address.

A specific example of the third preferred embodiment of the present invention is explained below.

FIG. 16 exemplifies the system configuration where the third preferred embodiment of the present invention is implemented by using a relay 104 that can process a SOCKS64 protocol.

The SOCKS64 is a gateway method for making a mutual communication between IPv4 (Internet Protocol version 4. See RFC0791) and IPv6 (Internet Protocol version 6. See RFC2460). Here, the IPv4 is an address scheme stipulating a 32-bit network address, whereas the IPv6 is an address scheme stipulating a 128-bit network address.

In FIG. 16, a communication source node 102*s* specifies a communication destination node 102*d* with an FQDN, and makes a communication. A SOCKS64 server 1601, which corresponds to the relay 104 shown in FIG. 1, retrieves the FQDN in a DNS database, and relays the communication by using the IPv6 protocol if the corresponding communication destination node 102*d* is an IPv6 node, or the IPv4 protocol if the corresponding communication destination node 102*d* is an IPv4 node. As a result, the communication source node 102*s* can make the communication without being conscious of whether the communication destination node 102*d* is either an IPv4 or an IPv6 node. Here, in the example shown in FIG. 16, the communication source node 102*s* and the SOCKS64 server 1601 are connected not by a network layer protocol but by a SOCKS5 protocol. Essentially, however, this is an example where a suitable communication destination node 102*d* is determined by translating a network address with the use of existing DNS and FQDN.

However, the SOCKS64 method assumes that a communication source node 102*s* specifies a communication destination node 102*d* with an FQDN. Therefore, if the communication destination node 102*d* is specified with a network address such as an IP address, etc., other than the FQDN, there is a problem that a relay can be made only to a specified address. For example, with a SOCKS4 protocol, which is the protocol preceding the SOCKS5 protocol, only an IPv4 address can be specified as a network address of a communication destination node 102*d*. Accordingly, the communication source node 102*s* using the SOCKS4 protocol can make a communication only with an IPv4 node.

Therefore, in the third preferred embodiment of the present invention, the "address translation mechanism" is arranged in the SOCKS64 server 1601, so that an address which a SOCKS client requests to make a connection is inversely translated into an FQDN once, and next, the FQDN is name-solved to obtain an address of a necessary protocol. With this series of operations, an address of a necessary connection destination can be obtained, even if the communication source node 102*s* requests to make a connection by using not an FQDN but an arbitrary network address, so that the SOCKS64 server 1601 can perform a gateway function.

The above described three preferred embodiments of the present invention are explained by taking the expansion of a DNS used by the Internet as an example. However, the present invention is applicable also to a name retrieving system other than the DNS as a matter of course.

The present invention can be configured also as a computer-readable storage medium, when used by a computer, for causing the computer to execute functions similar to those implemented by a communications node or a relay in the above described preferred embodiments of the present invention. In this case, a program implementing the respective functions of the preferred embodiments of the present invention is loaded into a memory (a RAM, a hard disk, etc.) within the main body of the computer configuring the communications node or the relay via a portable storage medium such as a floppy disk, a CD-ROM disk, an optical disk, a removable hard disk, etc., and the program is executed.

What is claimed is:

1. A computer-readable storage medium on which is recorded a program, which is read by a computer when used by the computer configuring a name retrieving device retrieving information identifying a communications node being a network device within a communications network, for causing the computer to execute a function, the function comprising:

searching for the information identifying the communications node according to a name search condition into which at least one or a plurality of information effective for identifying the communications node is combined, wherein said information effective for identifying the communications node includes: a running state, a use state, positional information, information representing a characteristic of the communications node, and information representing information held by the communications node;

said searching uses an expanded name database, to which a record including a first field recording said name search condition and a second field recording a communications node satisfying said name search condition, can be registered; and said second field is updated dynamically as a communication node satisfying said name search condition varies;

said name database is included in a network device within the communications network;

said record is an address record, wherein the name search condition is included as part of a domain name registered to the address record;

said searching uses a domain name server, which is included in the network device within the communications network, searching said name database for the address record including the name search condition as the part of the domain name, and replying information identifying a communications node at a communication destination, which is registered to the address record, to a communications node at a communication source, in response to an inquiry, which is made from the communications node at the communication source, about the name search condition corresponding to the communications node at the communication destination;

the address record registered to the expanded name database is a type of a resource record containing an owner field, a type field, and an RDATA field in accordance with a specification of a domain name system;

the first field is the owner field;

the second field is the RDATA field;

an owner is specified for the inquiry by a first domain name having a first character string;

a type for specifying an address record is specified for the inquiry;

the first character string represents the name search condition and is defined as a reserved word;

the searching comprises replying, as the information, a reply including a content of RDATA found in a resource record whose owner matches the first domain name and whose type matches the type specified; and in the expanded name database, the resource record whose owner is a domain name including the first character string is updated as a state of a node changes.

2. A computer-readable storage medium on which is recorded a program, which is read by a computer when used by the computer configuring a name retrieving device retrieving information identifying a communications node being a network device within a communications network, for causing the computer to execute a function included in a network device within the communications network that receives a message sent from a sender node, the function comprising:

searching for the information identifying the communications node according to a name search condition into which at least one or a plurality of information effective for identifying the communications node is combined; and translating a network address into a final network address identifying a destination communications node at a communication destination after the message is received, when a communication from a communications node at a communication source, for which the name search condition designating the communications node at the communication destination as the network address corresponding to the communications node at the communication destination is specified, is to be relayed, wherein said information effective for identifying the communications node includes: a running state, a use state, positional information, information representing a characteristic of the communications node, and information representing information held by the communications node;

said searching uses an expanded name database, to which a record including a first field recording said name search condition and a second field recording a communications node satisfying said name search condition, can be registered;

said second field is updated dynamically as a communication node satisfying said name search condition varies;

said name database is included in a network device within the communications network;

said record is an address record, wherein the name search condition is included as part of a domain name registered to the address record;

said searching uses a domain name server, which is included in the network device within the communications network, searching said name database for the address record including the name search condition as the part of the domain name, and replying information identifying a communications node at a communication destination, which is registered to the address record, to a communications node at a communication source, in response to an inquiry, which is made from the communications node at the communication source, about the name search condition corresponding to the communications node at the communication destination;

the address record registered to the expanded name database is a type of a resource record containing an owner field, a type field, and an RDATA field in accordance with a specification of a domain name system;

the first field is the owner field;

the second field is the RDATA field;

an owner is specified for the inquiry by a first domain name having a first character string;

a type for specifying an address record is specified for the inquiry;

the first character string represents the name search condition and is defined as a reserved word;

the searching comprises replying, as the information, a reply including a content of RDATA found in a resource record whose owner matches the first domain name and whose type matches the type specified; and in the expanded name database, the resource record whose owner is a domain name including the first character string is updated as a state of a node changes.

3. A transmission process for a message having a destination, comprising:

before sending the message, resolving a part of a destination address responsive to destination information using a first resolver;

starting transmission of the message over a network toward the destination after the resolving of the part of the destination address;

resolving a remainder the destination address by a second resolver as the transmission proceeds after the starting of transmission of the message;

completing transmission to the destination address, where the destination address is represented by a condition to be satisfied at the destination, wherein the resolving the remainder comprises searching for information identifying a communications node according to the condition into which at least one or a plurality of information effective for identifying the communications node is combined, said information effective for identifying the communications node includes: a running state, a use state, positional information, information representing a characteristic of the communications node, and information representing information held by the communications node;

said searching uses an expanded name database, to which a record including a first field recording said condition and a second field recording a communications node satisfying said condition, can be registered;

said second field is updated dynamically as a communication node satisfying said condition varies;

said name database is included in a network device within the communications network;

said record is an address record, wherein the condition is included as part of a domain name registered to the address record;

said searching uses a domain name server, which is included in the network device within the communications network, searching said name database for the address record including the condition as the part of the domain name, and replying information identifying the destination, which is registered to the address record, to a communication source, in response to an inquiry, which is made from the communication source, about the condition corresponding to the destination;

the address record registered to the expanded name database is a type of a resource record containing an owner field, a type field, and an RDATA field in accordance with a specification of a domain name system;

the first field is the owner field;

the second field is the RDATA field;

an owner is specified for the inquiry by a first domain name having a first character string;

a type for specifying an address record is specified for the inquiry;

the first character string represents the condition and is defined as a reserved word;

the searching comprises replying, as the information, a reply including a content of RDATA found in a resource record whose owner matches the first domain name and whose type matches the type specified; and in the expanded name database, the resource record whose owner is a domain name including the first character string is updated as a state of a node changes.

4. A message transmission method, comprising:

transmitting a message toward a destination using an address represented by a condition specifying the destination; and obtaining, after the transmitting has started, a destination address of the destination responsive to a desired status specified by the condition and routing the message to the destination address, wherein the obtaining comprises searching for information identifying a communications node according to the condition into which at least one or a plurality of information effective for identifying the communications node is combined, said information effective for identifying the communications node includes: a running state, a use state, positional information, information representing a characteristic of the communications node, and information representing information held by the communications node;

said searching uses an expanded name database, to which a record including a first field recording said condition and a second field recording a communications node satisfying said condition, can be registered;

said second field is updated dynamically as a communication node satisfying said condition varies;

said name database is included in a network device within the communications network;

said record is an address record, wherein the condition is included as part of a domain name registered to the address record;

said searching uses a domain name server, which is included in the network device within the communications network, searching said name database for the address record including the condition as the part of the domain name, and replying information identifying the destination, which is registered to the address record, to a communication source, in response to an inquiry, which is made from the communication source, about the condition corresponding to the destination;

the address record registered to the expanded name database is a type of a resource record containing an owner field, a type field, and an RDATA field in accordance with a specification of a domain name system;

the first field is the owner field;

the second field is the RDATA field;

an owner is specified for the inquiry by a first domain name having a first character string;

a type for specifying an address record is specified for the inquiry;

the first character string represents the condition and is defined as a reserved word;

the searching comprises replying, as the information, a reply including a content of RDATA found in a resource record whose owner matches the first domain name and whose type matches the type specified; and in the expanded name database, the resource record whose owner is a domain name including the first character string is updated as a state of a node changes.

5. A name retrieving device retrieving information identifying a communications node, which is a network device within a communications network, comprising:

a condition searching unit searching for the information identifying the communications node according to a name search condition into which at least one or a plurality of information effective for identifying the communications node is combined, wherein said information effective for identifying the communications node includes: a running state, a use state, positional information, information representing a characteristic of the communications node, and information representing information held by the communications node;

said condition searching unit comprises an expanded name database, to which a record including a first field recording said name search condition and a second field recording a communications node satisfying said name search condition, can be registered;

said second field is updated dynamically as a communication node satisfying said name search condition varies;

said name database is included in a network device within the communications network;

said record is an address record, wherein the name search condition is included as part of a domain name registered to the address record;

said condition searching unit comprises a domain name server, which is included in the network device within the communications network, searching said name database for the address record including the name search condition as the part of the domain name, and replying information identifying a communications node at a communication destination, which is registered to the address record, to a communications node at a communication source, in response to an inquiry, which is made from the communications node at the communication source, about the name search condition corresponding to the communications node at the communication destination;

the address record registered to the expanded name database is a type of a resource record containing an owner field, a type field, and an RDATA field in accordance with a specification of a domain name system;

the first field is the owner field;
the second field is the RDATA field;
an owner is specified for the inquiry by a first domain name having a first character string;
a type for specifying an address record is specified for the inquiry;
the first character string represents the name search condition and is defined as a reserved word; and
the condition searching unit replies, as the information, a reply including a content of RDATA found in a resource record whose owner matches the first domain name and whose type matches the type specified; and
in the expanded name database, the resource record whose owner is a domain name including the first character string is updated as a state of a node changes.

6. The name retrieving device according to claim 5, wherein
the running state of the communications node is at least one or a plurality of a state of a power supply, a connection state of a network and a communication state of a network.

7. The name retrieving device according to claim 5, wherein
the use state of the communications node is at least one or a plurality of information about a user, information about a running time, and information about a load.

8. The name retrieving device according to claim 5, wherein
the positional information of the communications node is at least one or a plurality of a geographical position or coordinate information, an address or a postal code used by a postal service, and a number of a building or a room.

9. The name retrieving device according to claim 5, wherein
the information representing the characteristic of the communications node is at least one or a plurality of a type, a function, a shape, a color, device information, software information, performance, and administrator information of the communications node.

10. The name retrieving device according to claim 5, wherein
the information representing the characteristic of the communications node is at least one or a plurality of management information of a file existing within a local file device of the communications node, and a type of information stored in the file.

11. The name retrieving device according to claim 5, receiving a message sent from a sender node, further comprising:
an address translating/relaying unit, which is included in a network device within the communications network, translating a network address into a final network address identifying the communications node at the communication destination after the message is received, when a communication from the communications node at the communication source, for which the name search condition designating the communications node at the communication destination as the network address corresponding to the communications node at the communication destination is specified, is to be relayed.

12. The name retrieving device according to claim 11, wherein
the name search condition designating the communications node at the communication destination is a condition into which at least one or a plurality of a running state of the communications node at the communication destination, or information held by the communications node at the communication destination are combined.

13. The name retrieving device according to claim 11, wherein
said address translating/relaying unit performs a relay process based on a SOCKS protocol, and performs, at least once, a process for inversely translating an address into an FQDN being a fully qualified domain name by using a domain name server, and for translating the FQDN into an IP address next by again using the domain name server if the address of the communications node at the communication destination is an IP address, so that a final network address of the communications node at the communication destination is obtained.

14. The name retrieving device according to claim 5, wherein
a value, indicating that the resource record to be searched is an address record which is one type of the resource record, is specified for the type in the inquiry.

15. A name retrieving device retrieving information identifying a communications node, which is a network device within a communications network, comprising:
a condition searching unit searching for the information identifying the communications node according to a name search condition into which at least one or a plurality of information effective for identifying the communications node is combined,
wherein said information effective for identifying the communications node includes: a running state, a use state, positional information, information representing a characteristic of the communications node, and information representing information held by the communications node;
said condition searching unit comprises an expanded name database, to which a record including a first field recording said name search condition and a second field recording a communications node satisfying said name search condition, can be registered;
said second field is updated dynamically as a communication node satisfying said name search condition varies;
said name database is included in a network device within the communications network;
said record is a resource record, wherein a resource record type of the resource record represents the name search condition; and
said condition searching unit comprises a domain name server, which is included in the network device within the communications network, searching said name database for the resource record representing the name search condition, and replying information identifying a communications node at a communication destination, which is registered to the resource record, to a communications node at a communication source, in response to an inquiry, which is made from the communications node at the communication source, about the name search condition corresponding to the communications node at the communication destination;
the resource record contains an owner field, a type field, and an RDATA field in accordance with a specification of a domain name system;
the first field is the type field;
the second field is the RDATA field;
an owner is specified for the inquiry;
a type is specified for the inquiry to be a first value representing a name search condition;
the condition searching unit replies, as the information, a reply including a content of RDATA found in a resource record whose owner matches the owner specified in the inquiry and whose type is the first value;

in the expanded name database, the resource record with the type of the first value is updated as a state of a node changes.

16. A name retrieving device retrieving information identifying a communications node, which is a network device within a communications network, comprising:

a condition searching unit searching for the information identifying the communications node according to a name search condition into which at least one or a plurality of information effective for identifying the communications node is combined, wherein said information effective for identifying the communications node includes: a running state, a use state, positional information, information representing a characteristic of the communications node, and information representing information held by the communications node;

said condition searching unit comprises an expanded name database, to which a record including a first field recording said name search condition and a second field recording a communications node satisfying said name search condition, can be registered;

said second field is updated dynamically as a communication node satisfying said name search condition varies;

said name database is included in a network device within the communications network;

said record is a resource record, wherein a resource record type of the resource record corresponds to an instruction to make a first inquiry corresponding to the name search condition;

said condition searching unit obtains latest information identifying a communications node at a communication destination at a time of the first inquiry by inquiring the communications node at the communication destination about the name search condition that is inquired in a second inquiry by a communications node at a communication source, and replies obtained information to the communications node at the communication source; and said condition searching unit comprises:

a domain name server, which is included in the network device within the communications network, searching said name database for the resource record instructing to make the first inquiry corresponding to the name search condition, obtaining the latest information identifying the communications node at the communication destination at the time of the first inquiry by making the first inquiry based on an instruction to make the first inquiry, which is registered to the resource record, replying obtained information to the communications node at the communication source, in response to the second inquiry, which is made from the communications node at the communication source, about the name search condition corresponding to the communications node at the communication destination, and registering the latest information identifying the communications node at the communication destination at the time of the first inquiry to said name database; the resource record contains an owner field, a class field, a type field representing the resource record type, and an RDATA field in accordance with a specification of a domain name system;

the first field is the type field;
the second field is for caching a result of the first inquiry;
the RDATA field holds the instruction;
an owner is specified for the second inquiry;

for the second inquiry, a first value is specified as a class in order to indicate that the instruction registered in the RDATA field be executed;

for the second inquiry, a type is specified to be a second value representing the name search condition;

the condition searching unit executes the instruction thereby identifying a node satisfying the name search condition represented by the second value, and returning a reply as the obtained latest information including information indicating the node identified to the communications node at the communication source; and the condition searching unit registers by caching the obtained latest information in the second field.

17. The name retrieving device according to claim 16, wherein said name database is distributed and included in a plurality of network devices within the communications network, and the name search condition, to which an unpropagation attribute instructing to prohibit propagation to a name database within a different network device is selectively attached, can be registered to said name database, and the domain name server searches for the resource record corresponding to the name search condition, and replying information identifying the communications node at the communication destination to the communications node at the communication source, in response to the second inquiry, which is made from the communications node at the communication source, about the name search condition corresponding to the communications node at the communication destination.

18. A computer-readable storage medium on which is recorded a program, which is read by a computer when used by the computer configuring a name retrieving device retrieving information identifying a communications node being a network device within a communications network, for causing the computer to execute a function, the function comprising:

searching for the information identifying the communications node according to a name search condition into which at least one or a plurality of information effective for identifying the communications node is combined, wherein said information effective for identifying the communications node includes: a running state, a use state, positional information, information representing a characteristic of the communications node, and information representing information held by the communications node;

said searching uses an expanded name database, to which a record including a first field recording said name search condition and a second field recording a communications node satisfying said name search condition, can be registered;

said second field is updated dynamically as a communication node satisfying said name search condition varies;

said name database is included in a network device within the communications network;

said record is a resource record, wherein a resource record type of the resource record represents the name search condition; and said searching uses a domain name server, which is included in the network device within the communications network, searching said name database for the resource record representing the name search condition, and replying information identifying a communications node at a communication destination, which is registered to the resource record, to a communications node at a communication source, in response to an inquiry, which is made from the communications node at the communication source, about the name search condition corresponding to the communications node at the communication destination;

the resource record contains an owner field, a type field, and an RDATA field in accordance with a specification of a domain name system;

the first field is the type field;

the second field is the RDATA field;

an owner is specified for the inquiry;

a type is specified for the inquiry to be a first value representing a name search condition;

the searching comprises replying, as the information, a reply including a content of RDATA found in a resource record whose owner matches the owner specified in the inquiry and whose type is the first value;

in the expanded name database, the resource record with the type of the first value is updated as a state of a node changes.

19. A computer-readable storage medium on which is recorded a program, which is read by a computer when used by the computer configuring a name retrieving device retrieving information identifying a communications node being a network device within a communications network, for causing the computer to execute a function, the function comprising:

searching for the information identifying the communications node according to a name search condition into which at least one or a plurality of information effective for identifying the communications node is combined, wherein said information effective for identifying the communications node includes: a running state, a use state, positional information, information representing a characteristic of the communications node, and information representing information held by the communications node;

said searching uses an expanded name database, to which a record including a first field recording said name search condition and a second field recording a communications node satisfying said name search condition, can be registered;

said second field is updated dynamically as a communication node satisfying said name search condition varies;

said name database is included in a network device within the communications network;

said record is a resource record, wherein a resource record type of the resource record corresponds to an instruction to make a first inquiry corresponding to the name search condition;

said searching comprises obtaining latest information identifying a communications node at a communication destination at a time of the first inquiry by inquiring the communications node at the communication destination about the name search condition that is inquired in a second inquiry by a communications node at a communication source, and replying obtained information to the communications node at the communication source; and said searching uses a domain name server, which is included in the network device within the communications network, searching said name database for the resource record instructing to make the first inquiry corresponding to the name search condition, obtaining the latest information identifying the communications node at the communication destination at the time of the first inquiry by making the first inquiry based on an instruction to make the first inquiry, which is registered to the resource record, replying obtained information to the communications node at the communication source, in response to the second inquiry, which is made from the communications node at the communication source, about the name search condition corresponding to the communications node at the communication destination, and registering the latest information identifying the communications node at the communication destination at the time of the first inquiry to said name database;

the resource record contains an owner field, a class field, a type field representing the resource record type, and an RDATA field in accordance with a specification of a domain name system;

the first field is the type field;

the second field is for caching a result of the first inquiry;

the RDATA field holds the instruction;

an owner is specified for the second inquiry;

for the second inquiry, a first value is specified as a class in order to indicate that the instruction registered in the RDATA field be executed;

for the second inquiry, a type is specified to be a second value representing the name search condition;

the searching comprises executing the instruction thereby identifying a node satisfying the name search condition represented by the second value, and returning a reply as the obtained latest information including information indicating the node identified to the communications node at the communication source; and the searching comprises registering by caching the obtained latest information in the second field.

* * * * *